May 13, 1969     T. FRAYER     3,443,594
PROPORTIONAL PRESSURE VALVE
Filed Nov. 21, 1966
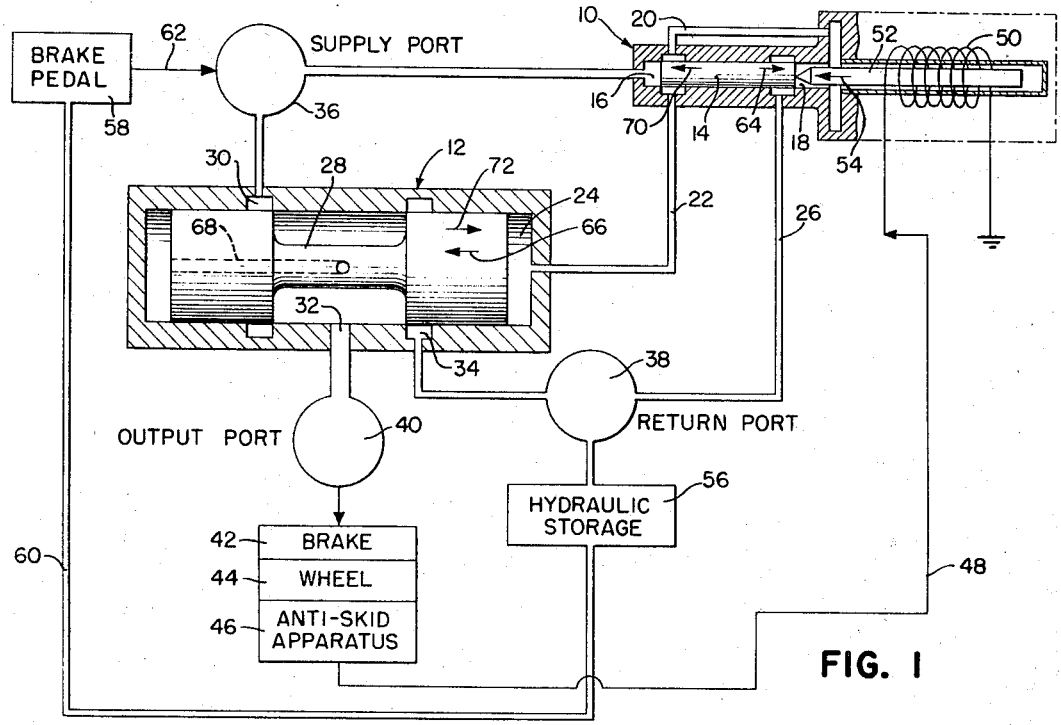
FIG. 1
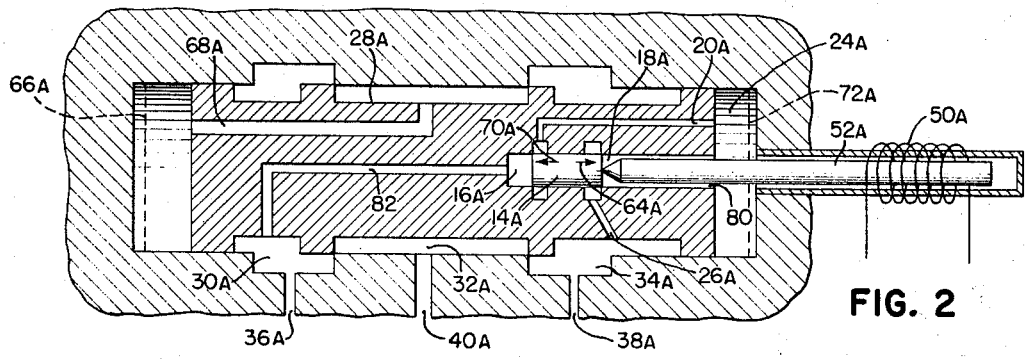
FIG. 2
FIG. 3
INVENTOR.
THEODORE FRAYER
BY
Oldham & Oldham
ATTORNEY

United States Patent Office 3,443,594
Patented May 13, 1969

3,443,594
PROPORTIONAL PRESSURE VALVE
Theodore Frayer, North Canton, Ohio, assignor to The Goodyear Tire & Rubber Company, Akron, Ohio, a corporation of Ohio
Filed Nov. 21, 1966, Ser. No. 595,660
Int. Cl. E03b; E03c; F17d
U.S. Cl. 137—625.64
2 Claims

ABSTRACT OF THE DISCLOSURE

A proportional pressure valve wherein the supply of a large hydraulic pressure to a brake may be controlled by a very small actuating force in a regenerative or degenerative manner depending upon the specific application requirements. Specifically, the valve incorporates a pilot piston and a slave piston wherein the pilot piston slides within the slave piston with appropriate passages interconnecting respective ports of the pilot piston through the slave piston and to the respective ports of the slave piston. The pistons slide together during actuation thereof, and actually have a relative sliding relationship to each other which provides either a regenerative or degenerative actuating action, depending on whether the sliding relationship is in the same or opposite directions.

---

This invention relates to a proportional pressure valve, and more particularly to a valve wherein the supply of a very high hydraulic pressure to a brake, for example, may be controlled by a very small actuating force supplied for example, by an electrically driven solenoid, and further where the pressure control by the externally applied force may be regenerative or degenerative depending upon the specific application requirements.

The relationship between electrical signal and output pressure may be directly proportional or inversely proportional. The arrangements shown in the figures used in this patent application are of the inversely proportional type because of a particular market usage.

Heretofore, it has been well known that there have been many and varied valve arrangements for proportionally supplying pressure as selectively desired. However, these prior art attempts have not been able to control hydraulic volumes with small actuating forces and have the output pressure proportional to the actuating force over a wide range of supply pressures. The conventional servo valves heretofore utilized for this method have included small bleeding orifices which necessarily waste hydraulic power especially when no control signal is being applied.

Therefore, it is the general object of the present invention to avoid and overcome the foregoing and other difficulties of and objections to prior art practices by the provisions of a proportional pressure valve which utilizes a small pilot valve to control a large slave valve wherein very small actuating pressures to the pilot valve control very large or high outlet pressures and volume from the slave valve.

A further object of the invention is to provide a proportional pressure valve wherein the pilot valve is slidably carried by the slave valve with interrelation therebetween to provide a regenerative or degenerative relationship for the external pressure applied to the pilot valve depending upon the interconnected relationship between the pilot and slave valves.

A further object of the invention is to provide a proportional pressure valve which may be incorporated into the hydraulic system for anti-skid apparatus associated with rotating pneumatic tires, particularly adapted to aircraft usage, with such valve being driven by the small electrical current generated by the anti-skid apparatus to effectively control the large volume and pressure of hydraulic fluid necessary for the braking action on such pneumatic tires.

The aforesaid objects of the invention and other objects which will become apparent as the description proceeds are achieved by providing in a pressure proportional valve the combination of a sliding pilot valve having separate inlet, outlet, and dumping ports, and a feedback between the inlet and oulet ports, a sliding slave valve having separate inlet, outlet, and dumping ports with a feedback between the inlet and outlet ports, the slave valve being connected in slave relation to the pilot valve wherein the slave valve is adapted to carry a much larger hydrualic volume than the pilot valve, and with the dumping ports connected in common between the valves, and means to apply a selective external pressure to the sliding pilot valve to thereby selectively close the inlet port and connect the outlet port to the dumping port whereby the slave valve in turn follows the pilot valve.

For a better understanding of the invention reference should be had to the accompanying drawings, wherein:

FIG. 1 is a schematic illustration of the overall concept illustrating the relationship between the pilot and supply valve in a complete schematic arrangement;

FIG. 2 is an enlarged cross sectional broken away view of a regenerative feedback wherein the pilot valve is slidably associated with the slave valve, yet still utilizing substantially the same concept as shown in FIG. 1; and FIG. 3 is an enlarged cross sectional broken away view of a degenerative feedback with the pilot valve slidably received in the slave valve, yet still utilizing substantially the same relationships illustrated in FIG. 1.

While it should be understood that the proportional pressure valve of the invention could be utilized in any hydraulic system for pressure control in accordance with an external signal, the valve was particularly developed for use with an aircraft anti-skid system, and hence it has been so illustrated and will be so described.

With reference to the form of the invention illustrated in FIG. 1 of the drawings, the numeral 10 illustrates a pi'ot valve and a slave valve is indicated generally by numeral 12. The pilot valve 10 has a sliding piston 14 which is slidable into and out of an inlet port 16, and a return passage 26 to thereby selectively control hydraulic fluid passing into a feedback line 20 between the inlet and return passage 16 and 26. Pressure in passages 18, 20 and 22 will be a percentage of supply pressure depending on the position of piston 14 between ports at each end. Further, the sliding of piston 14 selectively allows passage of hydraulic fluid into a transfer duct 22 passing to the outlet end 24 of slave valve 12, and into a return passage 26.

In a similar manner, the slave valve 12 has a double ended elongated piston 28 which is slidable within the cylinder of the valve body to control fluid flow into an inlet port 30, a discharge port 32, and a return port 34.

Each of the respective inlet ports 16 and 30 for the pilot and slave valves are connected to a common hydraulic fluid supply port 36. In the same manner, the return port 34 of the slave valve 12 is connected to a common return port 38 which is also connected to return passage 26 from the pilot valve 10.

The hydraulic fluid passing into the discharge port 32 from slave valve 12 is quite large and feeds into an enlarged outlet port 40. The outlet port 40 provides the hydraulic pressure actuation to a brake indicated by block 42. The brake 42, in the usual manner is mounted to a rotating wheel 44, which wheel 44 carries conventional anti-skid apparatus 46. The anti-skid apparatus 46 is designed in this instance to produce an electrical output signal which passes over output line 48 to provide actuation to an electrically driven solenoid 50. The solenoid 50 drives a central actuating piston 52 which is adapted to directly contact the sliding piston 14 of pilot valve 10 without restricting the flow of hydraulic fluid through feedback line 20 from the inlet port 16 to the outlet port 18 of the pilot valve 10. The invention contemplates that the more electrical current passed from the anti-skid apparatus 46 over line 48 indicating an approaching skid condition will drive the piston 52 under more and more force into the end of the piston 14 in a direction indicated by an arrow 54.

The hydraulic fluid passing into the return port 38 is dumped from there into a hydraulic storage tank 56. Any conventional pressure source, in this instance indicated by a brake pedal 58 then draws its hydraulic fluid supply from the hydraulic storage 56 over a line 60, and provides the desired selective pressure actuation, for example by a pilot depressing the brake pedal, to supply hydraulic fluid under pressure to the supply port 36 over line 62.

It should be understood that the schematic illustration of FIG. 1 illustrates both the pilot valve 10 and slave valve 12 in an equilibrium position wherein there are no fluid flows or pressure transfers taking place. The operation of the system occurs as follows: The pilot of the aircraft presses on the brake pedal 58 causing a transfer of hydraulic pressure over line 62 into the supply port 36. This immediately places the full hydraulic pressure on the inlet port 16 of pilot valve 10 and inlet port 30 of slave valve 12. It is assumed at this point that there is no electrical signal from the anti-skid apparatus 46 so that the piston 52 of solenoid 50 is not opposing any movement of the piston 14 of pilot valve 10. Thus, piston 14 immediately slides to the right as indicated by arrow 64 thereby allowing full supply inlet pressure to pass through passage 22 onto the outlet side of piston 28 of slave valve 12. This causes piston 28 to slide very rapidly to the left indicated by arrow 66 thus completely opening the inlet port 30 of valve 12 and allowing an almost direct transfer of pressure through outlet ports 32 and 40 for an application of pressure to the brake 42. It should be noted that both the pistons 14 and 28 of their respective valves will slide and bottom in essence on their respective limiting surfaces. However, since the feedback line 20 subsequently allows the transfer of supply or inlet pressure to the opposite end of piston 14 in pilot valve 10, equilibrium will be achieved and piston 14 will remain in its initially displaced position. Similarly, since there is a feedback port 68 extending from the center of piston 28 to its inlet end, the inlet pressure will pass therethrough and stabilize on both sides of piston 28 thereby positioning it in equilibrium in its displaced position.

Both pilot and slave valves 10 and 12 will remain in these equilibrium displaced positions allowing a direct application of pressure to the brake 42 until a skid begins to develop. At this point, the anti-skid apparatus 46 will send an electrical signal over line 48 causing the plunger 52 of solenoid 50 to move in a direction indicated by arrow 54. Since the piston 14 is in an equilibrium position with substantially equal pressures applied on both ends thereof because of feedback line 20, it will take very little pressure to cause movement of piston 14 in the same direction of movement as plunger 54, or as indicated by an arrow 70. As the piston 14 is moved further to the left indicated by arrow 70, it will open up the return passage 26 causing a dumping of fluid pressure into the return port 38 and hence into the hydraulic storage 56. Similarly, as soon as this dumping occurs, the pressure applied to the outlet end 24 of piston 28 of the slave valve 12 will rapidly reduce in pressure as it passes out line 22, causing the piston 28 to move in a reverse direction as indicated by an arrow 72 thereby fully dumping the supply pressure through dumping port 34 and into the return port 38 fully relieving fluid pressure through outlet port 40 to the brake 42. Naturally, as soon as the skid conditions on the wheel 44 are relieved by a relief of the braking pressure, the anti- skid apparatus 46 will reduce its electrical output allowing the pressure from the hydraulic fluid supplied into the supply port 36 to again start the same cycle. This particular pilot-slave relationship thus clearly allows a very small application pressure through the plunger 52 to control large volumes and pressures of hydraulic fluid passing through the slave valve 12. There will be some hunting back and forth of the pilot valve 10 as it reacts to movements of plunger 52, but it should be readily understood that the slave valve 12 will immediately follow these movements, thus very precisely controlling the amount of fluid pressure and volume supplied to the brake 42.

FIG. 2 illustrates the combination of a pilot valve in slidable relation within a slave valve. Similar numbers, except with the suffix a are utilized to designate corresponding ports and structural components in relation to the apparatus of FIG. 1. Specifically, a pilot valve piston 14a is slidable within an axially directed passage 80 within a slave piston 28a. Hydraulic fluid under pressure may be admitted through a supply port 36a into an inlet port 30a of the slave valve portion. A passage 82 directly admits the inlet pressure to an inlet port 16a of the pilot valve. An output port 40a connects a discharge port 32a of the slave valve, while a return port 38a connects a return port 34a of the slave valve, and a discharge passage 26a from the pilot valve. A feedback passage 20a connects the inlet port 16a to the outlet port 18a of the pilot valve. Similarly a feedback line 68a connects the outlet port 32a to the inlet end of the slave valve. A plunger 52a actuated by a solenoid 50a provides the external actuation. Thus, in operation the initial application of pressure through supply port 36a tends to force piston 14a in a direction indicated by an arrow 64a. This allows inlet pressure to be passed to an outlet end 24a of piston 28a causing piston 28a to be moved to the left as indicated by dotted line 66a, thus allowing a direct application of the pressure from the supply port 36a to the output port 40a. Further, since there is a relative movement between the piston 14a and the piston 28a in opposite directions to each other, this regeneratively allows a faster application of pressure because the ports discharging the fluid under pressure are opened more quickly.

When an anti-skid electrical signal is received to actuate solenoid 50a to force plunger 52a in the opposite direction, the reverse occurs, as explained above with piston 14a moving in a direction indicated by an arrow 70a thus causing piston 28a to move to dotted line position 72a causing a dumping of the fluid under pressure through the return port 38a because this is the path of least resistance. Again, since there is a relative movement in opposite directions between the pistons 14a and 28a, the dumping of the fluid pressure is regenerative because the ports for dumping are opened up more quickly.

FIG. 3 illustrates a degenerative feedback with the pilot valve slidably mounted within the slave valve. In this embodiment similar components and ports are illustrated with the same numerals as used with respect to FIG. 1 except having the suffix b thereafter. It should be understood that the degenerative feedback is accomplished by both valves tending to move in the same direction which causes the ports to open more slowly. Thus, fluid under pressure is provided through a supply port 36b which connects through a passage 82b to the inlet side of pilot piston 14b causing a movement of piston 14b in a direction indicated by an arrow 64b which because of the inlet pressure also being supplied through a passage 84b passes through a passage 22b to the outlet end 24b of piston 18b thereby causing piston 18b to move in the same direction as piston 14b or to a dotted line position indicated by numeral 66b. Thus, it should be readily understood that since the movement of piston 18b is in the same direction as the movement of pistons 14b there will be a degenerative effect or a very slow opening of the passages to allow full application of the input pressure through supply port 36b to pass into the output port 40b.

In a similar manner, when a signal is applied to a solenoid 50b causing actuation of its plunger 52b the piston 14b is forced in an opposite direction indicated by an arrow 70b. This in turn immediately causes an opening of the dumping passage 26b to the return port 38b, while at the same time causes a dumping of the pressure in the discharge end 24b to pass through line 22b allowing a reduced pressure at end 24b thus causing piston 18b to move to the left to dotted line position 72b. Therefore, it is again seen that the independent movements of pistons 14b and 18b are each in the same directions causing a degenerative opening of the return port for dumping of pressure.

The specific applications for the regenerative or degenerative feedback relationship illustrated in FIG. 2 and 3 respectively will vary upon the particular characteristics desired for the system which is being utilized. Clearly, however, the relative sliding relationship between the pilot and slave pistons either in the same direction or in the opposite directions controls the regenerative or degenerative relationship. Of course, a valve without either regenerative relationship. Of course, a valve without either regeneration or degeneration, such as that shown in FIG. 1, may be utilized in the overall system. However, in each and every instance, a large hydraulic pressure and fluid volume can be controlled by a small electrical force applied to the solenoid because there is hydraulic balance on both pistons to place them substantially in equilibrium so that very slight pressure can cause movement thereof.

While in accordance with the patent statutes only one best known embodiment of the invention has been illustrated and described in detail, it is to be particularly understood that the invention is not limited thereto or thereby, but that various modifications may be made to still fall within the objects of the invention.

What is claimed is:

1. A pressure proportional valve which comprises a housing defining a cylindrically-shaped opening therein and having laterally spaced separate fluid inlet, outlet, and dumping ports through the housing,
   a large slave piston slidably received within the opening of the housing, said piston having an axially directed cylindrically-shaped opening therein, and separate fluid inlet and dumping ports formed as passages through the slave piston to interconnect to the ports through the housing,
   a small pilot piston slidably received within the opening in the slave piston said pilot piston having structural dimension and length so as to cooperate with the separate fluid inlet and dumping ports of the slave piston to effect a slave relationship between the pilot and slave pistons through the inlet and dumping ports and
   means to selectively control the relative sliding relation of the pilot piston within the slave piston in accordance with an external source, which is characterized by a first pressure chamber at one end of the slave piston connected to the inlet port through the passages in the slave piston and the cooperation with the pilot piston, and tending to move the slave piston to pressure position, a second pressure chamber at the other end of the slave piston connected to the outlet port through the passages of the slave piston, and tending to move the slave piston to provide a direct connection between the inlet port and the dumping port, the pilot piston being in communication with the first pressure chamber and movable from a closed position holding pressure in the first chamber to an open position discharging pressure from the first chamber to the dumping port.

2. A pressure proportional valve which comprises a housing defining a cylindrically-shaped opening therein and having laterally spaced separate fluid inlet, outlet, and dumping ports through the housing,
   a large slave piston slidably received within the opening of the housing, said piston having an axially directed cylindrically-shaped opening therein, and separate fluid inlet and dumping ports formed as passages through the slave piston to interconnect to the ports through the housing,
   a small pilot piston slidably received within the opening in the slave piston, said pilot piston having structural dimension and length so as to cooperate with the separate fluid inlet and dumping ports of the slave piston to effect a slave relationship between the pilot and slave pistons through the inlet and dumping ports, and
   means to selectively control the relative sliding relation of the pilot piston within the slave piston in accordance with an external source of power, which includes a first pressure chamber at one end of the slave piston and connected through at least one of the passages thereof to the outlet port and tending to move the slave piston in one direction to connect the outlet port to the dumping port, and a second pressure chamber at the other end of the slave piston and connected by at least one passage through the pilot piston to either the inlet or dumping ports dependent on the position of the pilot piston tending to move the slave piston to connect the inlet port to the outlet port upon actuation of the pilot piston to release pressure in the second chamber.

References Cited

UNITED STATES PATENTS

| | | | |
|---|---|---|---|
| 3,013,539 | 12/1961 | Rethmeier | 137—625.63 |
| 3,060,969 | 10/1962 | Aslan | 137—625.63 |
| 3,106,224 | 10/1963 | Moss et al. | 251—31 X |
| 3,286,734 | 11/1966 | Hartshorne | 137—625.64 |

CARROLL B. DORITY, JR., *Primary Examiner.*

U.S. Cl. X.R.

137—625.68; 91—361, 459